(No Model.)
R. RABY.
HEDGE CLIP.
No. 503,161. Patented Aug. 15, 1893.
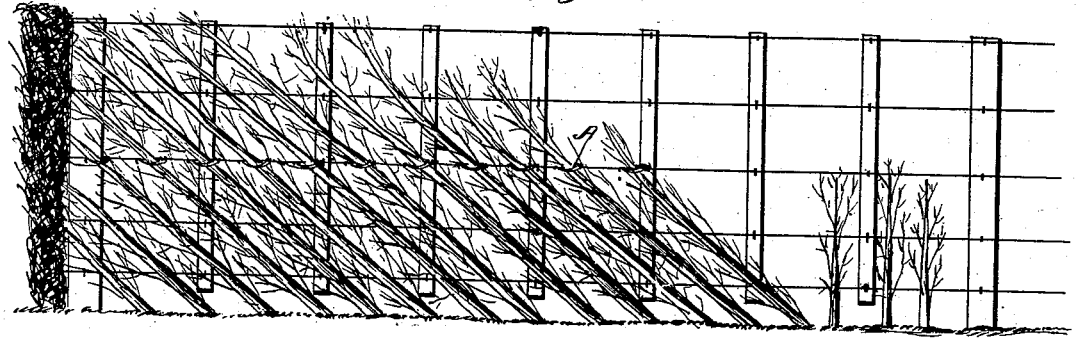
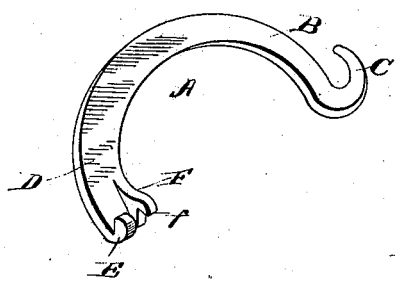
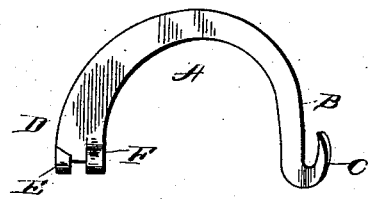
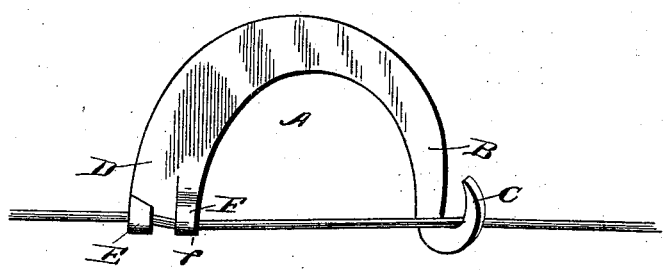
Witnesses
J. N. Fowler Jr
Wallace Murdock
Inventor
Richard Raby
By Church & Church
Attorneys

UNITED STATES PATENT OFFICE.

RICHARD RABY, OF YORK, PENNSYLVANIA.

HEDGE-CLIP.

SPECIFICATION forming part of Letters Patent No. 503,161, dated August 15, 1893.

Application filed December 12, 1892. Serial No. 454,861. (No model.)

*To all whom it may concern:*

Be it known that I, RICHARD RABY, of York, in the county of York and State of Pennsylvania, have invented certain new and useful Improvements in Hedge Clips or Fasteners; and I do hereby declare the following to be a full, clear, and exact description of the same, reference being had to the accompanying drawings, forming a part of this specification, and to the letters of reference marked thereon.

My invention relates to improvements in hedge clips or fasteners, and has for its object to provide a fastener whereby plants or vines may be held in place upon the horizontal wires of a fence or trellis.

The invention consists in certain novel details of construction and combination of parts all as I will now proceed to describe and point out particularly in the claims at the close of this specification.

In the accompanying drawings: Figure 1 is a view of a fence and hedge showing the application of my improved fastener. Fig. 2 is a perspective view of the fastener. Fig. 3 is a face view. Fig. 4 is an enlarged detail view showing the fastener applied to a strand of wire; Fig. 5, a view showing how the wire is bent when the fastener is applied.

Similar letters of reference in the several figures indicate the same parts.

In the accompanying drawings the letter A indicates my improved fastener of any suitable metal, preferably cast in substantially U-shape. One leg B of the fastener terminates in a hook C preferably bent out to one side of the plane of the fastener body, shown in Fig. 3. The other leg or branch D is made broader than branch B and is formed with the two lugs or hook projections E, F, at its end facing in opposite directions. The lug E is preferably shorter than F and has its face inclined or slanting toward lug F. This latter is formed with an overhanging top $f$ as shown for a purpose to be presently explained.

To fasten a plant in position on a wire fence or trellis with this device the clip or fastener is placed so that the wire will pass between the lugs E and F. The clip is then forced around so that the plant will be embraced between the two branches and the hook B is then sprung over the wire which operation is facilitated by reason of the flaring shape of the hook and by its being bent out to one side. It will be noted that the faces of the lugs E and F are just out of line so that when the fastener is turned on the wire as explained above, the wire will be bent abruptly as shown in Fig. 5, locking the fastener and thus preventing it from slipping longitudinally on the wire. By forming the lug F with the overhanging portion there will be no liability of the wire slipping up and allowing the fastener to become loose and drop off. The hook B is bent out of the plane of the body of the clip on the same side as the lugs or projections, or in other words, the hook is bent out and up say on the upper side while the projection nearest the hook has its operative face turned in the opposite direction or down; hence the tendency of the clip, will be to twist or turn on the wire in a direction toward the curve of the hook and therefore the greater tension of the wire, the tighter will the clip hold.

It will be seen from the foregoing that I have made a simple and effective fastener, one that is positively held from slipping on the wire and one not liable to become loose and useless. It can be easily applied and removed and will be found to be well adapted for either retaining vines in place or in the process of hedge fence building where the hedge plants are used in conjunction with a wire fence. With this device it is not necessary to wait until the body of the plants have grown strong enough to stand staples being driven through them, but when the young plants which are set along the line of the fence on one or both sides have reached the proper height, say the second year, as at this time they are pliable, they may be bent over at the proper angle and fastened to the fence by means of the clip. The loop or clip loosely encircles the plant and does not interfere with its growth, so that after the next year the new growth may be bent and fastened by the clip, the plants being trimmed and topped as usual. I have found that in this way the plants may be plashed much earlier than usual and by employing a wire fence in conjunction with the plants not only are the young plants protected while growing but I have a complete fence from the first which will confine stock, &c.

Having thus described my invention, what I claim as new is—

1. A rigid substantially U-shaped clip having the reversely arranged projections on one end between which the wire is passed and having the hook on the opposite end; substantially as described.

2. A rigid substantially U-shaped clip having the reversely arranged projections on one end between which the wire is passed, said projections being just out of line, and the hook at the opposite end, substantially as and for the purpose specified.

3. A rigid substantially U-shaped clip, having the reversely arranged projections on one end, between which the wire is passed, and a hook on the opposite end, one of said projections being formed with an overhanging projection, as and for the purpose set forth.

4. A rigid substantially U-shaped clip having the reversely arranged projections at one end between which the wire is passed and having the hook on the opposite end bent up out of the general plane of the body of the clip in a direction opposite the operative face of the nearer one of the projections; substantially as described.

RICHARD RABY.

Witnesses:
HARRY P. MILLER,
SAML. A. SHROFF.